United States Patent [19]

Medearis et al.

[11] 4,037,286

[45] July 26, 1977

[54] REARVIEW MIRROR FOR VEHICLES

[76] Inventors: G. P. Medearis, 1021 Faulkner Lane, Waco, Tex. 76704; Sam F. Williams, Jr., P.O. Box 35, Leroy, Tex. 76654; Morris O. Medearis, 2526 N. Cheyem, P.O. Box 2332, Tulsa, Okla. 74101

[21] Appl. No.: 649,028

[22] Filed: Jan. 14, 1976

[51] Int. Cl.² .............................. B60S 1/24; B60S 1/44
[52] U.S. Cl. .............................. 15/250.05; 15/250.29; 15/250 B; 350/61
[58] Field of Search ............. 15/250.29, 250.3, 250 A, 15/250 B, 250.05; 350/61

[56] References Cited

U.S. PATENT DOCUMENTS

| 3,526,920 | 9/1970  | Boyanich, Sr. ............. | 15/250 B  |
| 3,618,156 | 11/1971 | Riggs ........................... | 15/250.29 |
| 3,940,822 | 3/1976  | Emerick et al. ............. | 15/250 B  |

FOREIGN PATENT DOCUMENTS 862,903   3/1961   United Kingdom ............. 15/250.29

Primary Examiner—Peter Feldman
Attorney, Agent, or Firm—Head, Johnson & Chafin

[57] ABSTRACT

An outside rearview mirror for a vehicle including a rectangular vertical frame adapted to be supported outside a vehicle, a mirror supported by the frame, a gear motor attached to the frame and having a drive shaft, a crank arm secured to the drive shaft, a wiper bracket slidably supported on the frame for vertical reciprocation, a horizontal squeegee member secured to the wiper bracket engaging the mirror front surface, and a connecting rod extending from the outer end of the crankshaft to the wiper bracket so that when the gear motor is energized the wiper bracket is reciprocally actuated to wipe the mirror. As an alternate embodiment, the mirror may include an electric heating element to prevent ice from freezing on the mirror surface.

3 Claims, 2 Drawing Figures

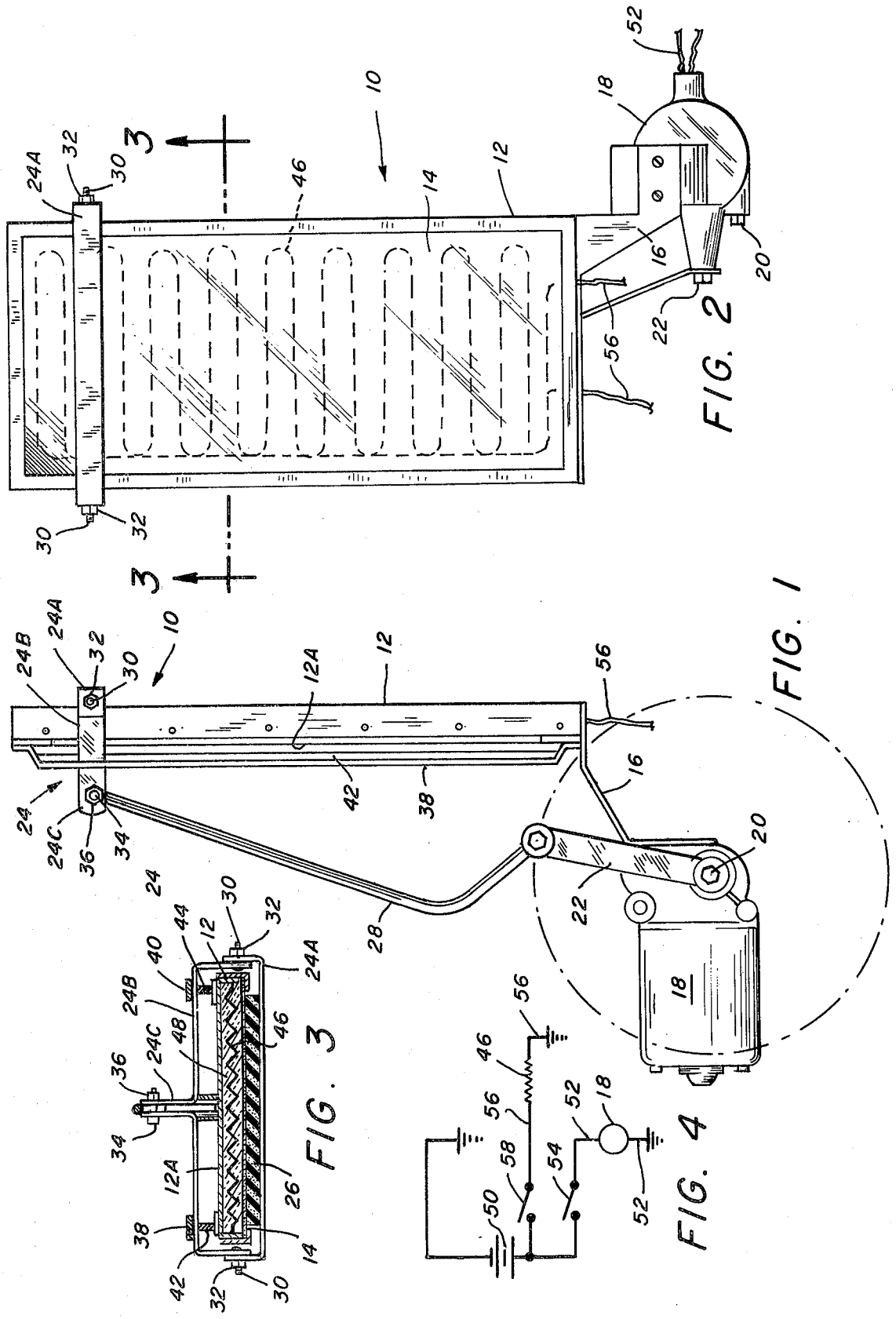

REARVIEW MIRROR FOR VEHICLES

BACKGROUND, SUMMARY AND OBJECTS OF THE INVENTION

All trucks, buses and other similar vehicles have rearview mirrors mounted outside the vehicle cab to enable drivers to see behind the vehicles. Rearview mirrors work satisfactorily except that during rainy weather the driver's vision is obscured by rain water on the mirror surfaces which distort the reflected image. Another difficulty arises during freezing weather when ice may freeze on the mirror to the extent of substantially obliterating the light reflecting ability of the mirror.

The present invention is directed towards an improved rearview mirror for vehicles including means of wiping the mirror to remove water from the reflecting surface.

More particularly, an object of this invention is to provide a rearview mirror, including a frame for mounting on the exterior of a vehicle, including a gear motor affixed to the mirror frame and including a vertically reciprocal squeegee member with means of vertically actuating the squegee member by the gear motor to wipe the mirror clean.

Another object of this invention is to provide a rearview mirror including a heating element means for preventing the mirror frame icing over in sub-freezing temperatures.

These general objects, as well as other and more specific objects of the invention, will be fulfilled in the following description and claims, taken in conjuction with the attached drawings.

DESCRIPTION OF VIEWS

FIG. 1 is a side view of the rearview mirror for vehicles of this invention.

FIG. 2 is a front view of the rearview mirror.

FIG. 3 is a cross-sectional view taken along the line 3—3 of FIG. 2.

FIG. 4 is a rudimentary wiring diagram for operation of the mirror.

DETAILED DESCRIPTION

Referring to the drawings, the rearview mirror of this invention is indicated generally by the numeral 10. The mirror includes a rectangular vertical frame 12. Supported by the frame, in the forward portion thereof, is a mirror 14.

Secured to frame 12 is a bracket 16 which supports a gear motor 18. Extending from the gear motor is a horizontal drive shaft 20. Attached to the drive shaft is one end of a crank arm 22.

Encompassing the mirror frame 12 is a wiper bracket 24 having a forward portion 24A and a rearward portion 24B. The wiper bracket forward portion 24A extends horizontally across the front of the frame and mirror 14. Secured to the wiper bracket forward portion 24A is a squeegee member 26 which contacts mirror 14. By the vertical reciprocation of the wiper bracket 24 the squeegee member 26 wipes the mirror 14 clean.

The rearward portion 24B of the wiper bracket pivotally receives the upper end of a connecting rod 28, the lower end of the rod being pivotally secured to the outer end of crank arm 22. As drive shaft 20 rotates the crank arm 22 connecting rod 28 transfers a reciprocal motion to the wiper bracket 24 to cause the squeegee to wipe the mirror 14.

The wiper bracket 24 is, as has been previously indicated, formed of two portions, the forward portion 24A and the rearward portion 24B. The portions are held together by bolts 30 and nuts 32 at each end of the bracket. The wiper bracket rearward portion 24B is illustrated as including a rearwardly extending portion 24C which receives the upper end of the connecting rod 28. The portion 24C is pivotally secured to the connecting rod 28 by means of a bolt 34 and nut 36.

To retain the wiper bracket in proper position relative to the mirror 14, a first vertical guide member 38 and a second vertical guide member 40 are provided. Each of the vertical guides 38 and 40 are secured at the upper and lower end thereof to the back surface of the frame 12. The guide members 38 and 40 are spaced from and parallel to each other and a portion of the guide members intermediate the ends are spaced from and parallel the back surface 12A of the frame. The wiper bracket rearward portion 24B is slidably received between the frame rearward surface 12A and the brackets 38 and 40. To insure closed but slidable relationship between the wiper bracket rearward portion 24B and the vertical guides 38 and 40, a pair of spacers 42 and 44 are secured to the frame rear surface 12A. The spacers 42 and 44 are vertical and positioned opposite vertical guides 38 and 40.

Positioned within the frame 12 and rearwardly of the mirror 14 is a heating element 46. The heating element 46 may be in the form of a electrically heated conductor, such as nichrome wire, which is placed in a pattern such as shown in dotted outline in FIG. 2. The function of the heating element is, when energized, to keep the mirror 14 at a temperature below freezing so that all moisture occurring on the mirror may be wiped off of the squeegee member 26. The heating element 46 may be encompassed in a nonelectrically conductive but heat conductive material, such as magnesium oxide 49, or the heating wire may be insulated by use of asbestos, or any other material which will prevent contact with the conductive portions of frame 12.

FIG. 4 shows a rudimentary wiring diagram. Utilizing energy from battery 50, such as a vehicle battery, gear motor 18 may be energized through conductors 52 in series with a switch 54, which may be positioned within the vehicle cab. In like manner heating element 46 may be energized by means of conductors 56 in series with switch 58 which is likewise preferably positioned within the cab of the vehicle. By means of switches 54 and 58 the rearview mirror can be controlled to keep it wiped clean in any precipitous weather and, if freezing conditions exist, heating element 46 may be energized so that at all times the mirror can be cleaned and clear of water to accurately reflect the conditions behind the vehicle.

No brackets are shown as means of attaching the rearview mirror to a vehicle since such brackets are commonly employed at the present time in all types of vehicle rearview mirrors. The brackets may extend from the top or bottom of the frame, or both from the top and bottom. While the gear motor 18 is shown in the illustration as being attached to the rear portion of the frame, it can be seen that it can equally as well be attached to the top of the frame.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim, or claims, including the full range of equivalency to which each element thereof is entitled.

What is claimed:

1. An outside rearview mirror for a vehicle, comprising:
    a rectangular vertical frame adaptable to be supported outside a vehicle;
    a mirror supported by said frame in the front portion thereof, the mirror having a front surface and a rear surface;
    a gear motor supported to said frame, the gear motor having a drive shaft extending therefrom;
    a crank arm secured at the inner end to said drive shaft for rotation by said gear motor;
    a wiper bracket slidably supported on said frame for vertical reciprocation;
    a horizontal squeegee member secured to said wiper bracket engaging said mirror front surface;
    a first and second vertical guide member each secured at the upper and lower ends thereof to the back surface of said frame, the guide members being spaced apart from and parallel to each other, the portion of said guide members intermediate the ends being spaced from said frame, said wiper bracket being slidably received between said frame and said guide members intermediate portion whereby said wiper bracket is reciprocally retained in position relative to said frame, a pair of vertically aligned spacers positioned opposite said first and second vertical guide members; and
    a connecting rod extending from the outer end of said crank to said wiper bracket, said wiper bracket being vertically reciprocated by the rotation of said gear motor drive shaft to wipe said mirror, and
    wherein said wiper bracket includes a rearward portion and a forward portion, the rearward portion extending adjacent the back surface of said frame and having one end of said connecting rod pivotally attached to the central portion of said rearward portion, the front portion extending adjacent said mirror front surface and having said squeegee member affixed thereto, said front portion being detachable from said rearward portion to facilitate the replacement of said squeegee member, said rearward portion being slidable between said vertical spacers and said vertical guide members.

2. An outside rearview mirror for a vehicle according to claim 1 including:
    an electrical heating element supported by said frame adjacent said mirror rear surface.

3. An outside rearview mirror for a vehicle according to claim 2 including switch means in series with said gear motor, and separate switch means in series with said heating element whereby said gear motor and said heating element may by separately and independently energized.

* * * * *